United States Patent

Vollmer

[15] 3,665,489

[45] May 23, 1972

[54] TELEPHONE INSTRUMENT FOR VOICE FREQUENCY CHOICE OF NUMBER

[72] Inventor: Herman Josef Burghardt Vollmer, Vendslso, Sweden

[73] Assignee: Telefonaktiebolaget LM Ericsson, Stockholm, Sweden

[22] Filed: May 20, 1970

[21] Appl. No.: 39,096

[30] Foreign Application Priority Data

June 6, 1969 Sweden ....................................8033/69

[52] U.S. Cl. ..........................................179/90 K, 179/16 F

[51] Int. Cl. ..........................................H04m 1/50

[58] Field of Search ...............179/16 AA, 84 VF, 90 K, 16 F, 179/2 DP; 331/109, 175, 182, 185

[56] References Cited

UNITED STATES PATENTS

| | | | |
|---|---|---|---|
| 3,424,870 | 1/1969 | Breeden | 179/90 K |
| 3,184,554 | 5/1965 | Meacham | 179/84 VF |
| 3,476,881 | 11/1969 | Hensbergen | 179/16 AA |
| 2,812,383 | 11/1957 | Buchner | 179/16 AA |
| 3,508,013 | 4/1970 | Monin | 179/90 K |
| 3,454,726 | 7/1969 | Gasser | 179/84 VF |

FOREIGN PATENTS OR APPLICATIONS

| | | | |
|---|---|---|---|
| 906,158 | 4/1959 | Great Britain | 179/16 AA |

*Primary Examiner*—Kathleen H. Claffy
*Assistant Examiner*—Tom D'Amico
*Attorney*—Hane, Baxley & Spiecens

[57] ABSTRACT

There is disclosed a voice frequency oscillator included in a telephone instrument for voice frequency signalling, wherein the frequency of the oscillator can be set to predetermined values by the influence of certain contacts. The oscillator includes a circuit which in calling state is connected in series with the line loop of the telephone instrument. This circuit determines, by voltage dividing, the operating point of the oscillator. The circuit comprises two parallel branches with different impedance values, which by a make-and-break contact can be alternatively connected to the line loop for providing two different values of current passing through the line for signalling two different states.

2 Claims, 2 Drawing Figures

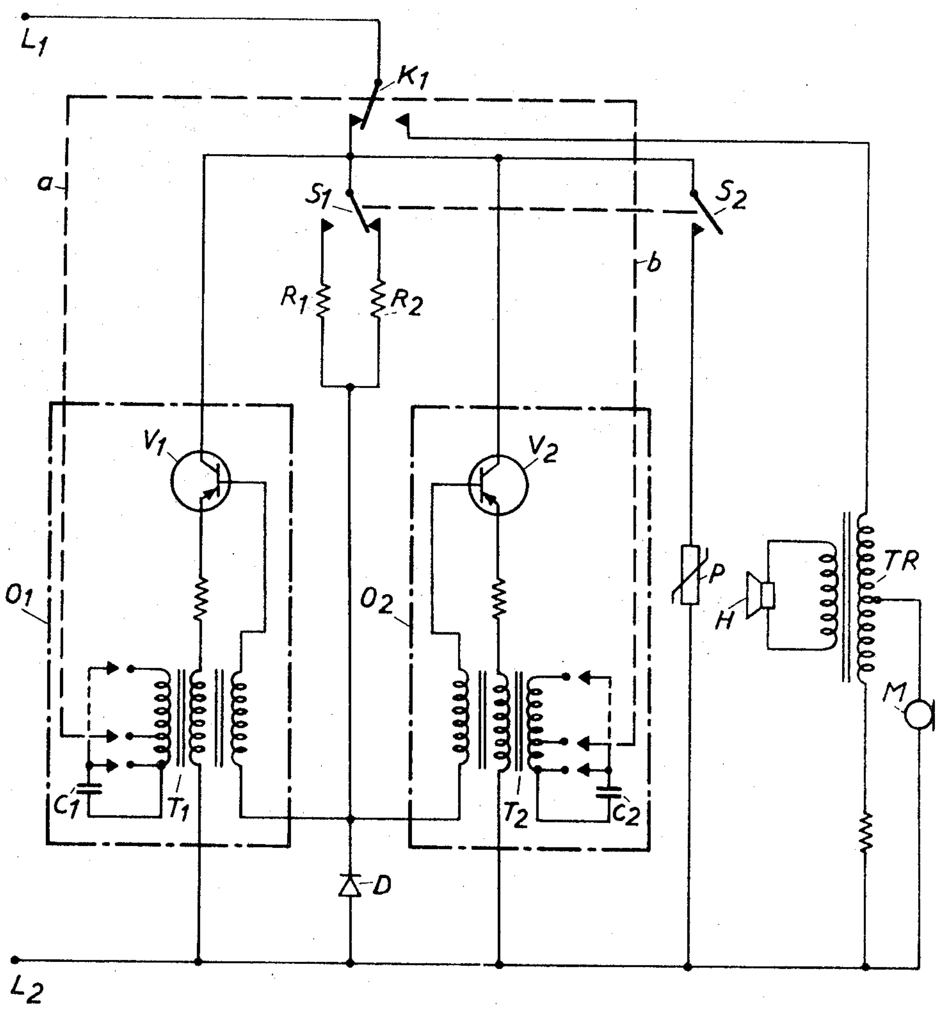
INVENTOR
HERMAN JOSEF BURCHARDT VOLLMER
BY Kane, Dalsimer and Spiecens
ATTORNEYS

TELEPHONE INSTRUMENT FOR VOICE FREQUENCY CHOICE OF NUMBER

The present invention relates to a telephone instrument for voice frequency by dialing which has at least a voice frequency, oscillator whose frequency may be set to predetermined values by the influence of certain contacts.

In addition to generating the digital signals necessary for the establishment of a connection it is also required that telephone instruments working with voice frequency by dialing can be used for among other things, the carrying out of a call to a third subscriber during a call in progress and in certain cases it is also required that it should be able to transmit digit information to a called subscriber. These objects to a certain extent require measures that are opposed to each other. For example, if it is desirable to be able to transmit digital signals with voice frequency to the called subscriber, e.g. for data processing, it will not be possible to be temporarily connected during a call in progress to a third subscriber by sending a digital signal. For there is no possibility of calling in a voice frequency signalling receiver in the telephone exchange as there is no device that can determine whether the emitted voice frequency signals are intended for the established called subscriber or, for example, for a voice frequency signalling receiver in the exchange. On the other hand, it is conceivable that simultaneously with the sending of the digital signal an additional signal is emitted across the line, which signal automatically connects a voice frequency signalling receiver in the exchange to the line. In this case it will not be possible, though, to send digital signals for transmission of data information to the called subscriber as each digital signal will cause a voice frequency signalling receiver to be automatically connected to the line and the called subscriber to be disconnected.

An object of the invention is to eliminate said inconvenience and to provide a telephone instrument whose oscillator makes the transmission of digit information to a called subscriber possible as well as the momentary connection of a third subscriber or further devices such as a data terminal equipment.

The characteristics of the invention will appear from the characterizing part of the appended claim.

The invention will be more fully described by means of an embodiment shown in the accompanying drawing which is a schematic wiring diagram of a telephone instrument for voice frequency key dialing where a connection according to the invention is used.

In the sole FIGURE a telephone instrument, which in a known manner includes a telephone receiver H, a microphone M and a transformer TR, is connected to the subscriber line $L_1L_2$. Furthermore the telephone instrument includes two oscillators $O_1O_2$ which can be connected in parallel to the subscriber line $L_1L_2$ for simultaneous transmission of two different voice frequencies. The oscillators $O_1$,$O_2$ may be of a known construction and according to the figure each oscillator includes an emitter-connected transistor $V_1$, $V_2$, transformer $T_1$, $T_2$ and a capacitor $C_1$, $C_2$. Upon influence of digit choice push buttons connecting the capacitors $C_1$, $C_2$ to different outputs of the secondary winding of the transformers $T_1$, $T_2$ a make-and-break contact $K_1$ is simultaneously by the ganging symbolized by means of the dashed lines *a* and *b*. The contact $K_1$ connects the oscillators to the loop of wire at the same time as the telephone receiver and the microphone of the instrument are disconnected. By the fact that the capacitors are connected to different taps of the transformer different oscillating circuits are established, each of which defines an emitted voice frequency. A circuit common for the two oscillators and connected to the line $L_1$, $L_2$ includes a diode D and a switch $S_1$, which can connect either of two impedances $R_1$ or $R_2$ in series with the diode. The operating points of the oscillators are determined by the voltage divider which is formed by diode D and either of the impedances $R_1$ and $R_2$. One of these impedances, $R_1$, has a value which in size corresponds to the impedance value of the telephone instrument and the other one, $R_2$, has a considerably higher impedance (e.g. 10 times). By switching-over the switch $S_1$ the two oscillators thus obtain a high-ohmic or low-ohmic impedance dependent on whether it is desired that upon pressing the digit choice push buttons the telephone instrument should be connected to a voice frequency signalling receiver in the exchange or not. When a digit choice push button is pressed and the oscillators are connected when this circuit is high-ohmic, the current drops through the line loop and, in a way known per se, a relay in the telephone exchange is influenced causing a voice frequency signalling receiver to be connected to the line loop. If, on the other hand, the circuit is low-ohmic, and a connection to a called subscriber has already been established, this connection is not interrupted when a digit choice push button is pressed, but the digit information can pass to the called subscriber. A regulating element P, known per se, and consisting of for example a varistor, is connected in parallel with the oscillators $O_1$, $O_2$. This element is intended to provide, in a known manner, a compensation of the influence of the subscriber line on the outgoing voice frequency signal. For a short subscriber line the current through the element P is high and the impedance value of the element is low the oscillators are loaded with the consequence that the outgoing voice frequency signal is attenuated. For a long subscriber line the current in the loop is reduced and the impedance value of the element is increased. Thereby also the level of the outgoing voice frequency signal is increased. According to the example the regulating element P is only connected when the telephone loop is low-ohmic and is disconnected automatically when the one of the impedances $R_1$ and $R_2$ which is high-ohmic is connected.

We claim:

1. In a telephone instrument for voice frequency key dialing which is connectable to a line loop and which includes at least one voice frequency oscillator which is controllable connectable in series with said line loop, a circuit which by voltage dividing controls the operating point of the oscillator, said circuit comprising first and second terminals, a first switch having first and second fixed contacts and a transfer contact which is switchable between said first and second fixed contacts, said transfer contact being connected to said first terminal, a first impedor having one end connected to said first contact and a second end, a second impedor having one end connected to said second contact and a second end, said first impedor having a greater impedance value than said second impedor, means for connecting the second ends of said impedors to said second terminal, and means for connecting said first and second terminals to the oscillator whereby the circuit controls the current to the oscillator.

2. The circuit of claim 1 and further comprising a second switch, a variable resistor connected in series with said second switch, and means for connecting said second switch and said variable resistor in parallel with said first switch and said impedors, said switches being ganged in such a way that said variable resistor is connected in parallel with said second impeder when said first switch connects said second impedor to the oscillator.

* * * * *

UNITED STATES PATENT OFFICE
CERTIFICATE OF CORRECTION

Patent No. 3,665,489 Dated May 23, 1972

Inventor(s) Herman Josef Burghardt Vollmer

It is certified that error appears in the above-identified patent and that said Letters Patent are hereby corrected as shown below:

On the cover sheet under the ABSTRACT, "2 Drawing Figures" should read -- 1 Drawing Figure --.

Signed and sealed this 31st day of October 1972.

(SEAL)
Attest:

EDWARD M.FLETCHER,JR.
Attesting Officer

ROBERT GOTTSCHALK
Commissioner of Patents

FORM PO-1050 (10-69)
USCOMM-DC 60376-P69
☆ U.S. GOVERNMENT PRINTING OFFICE : 1969 O--366-334.